United States Patent
Leonardi et al.

(10) Patent No.: US 12,424,891 B2
(45) Date of Patent: Sep. 23, 2025

(54) ADHESIVE MIXTURE INCLUDING HARD MAGNETIC MATERIAL FOR E-MACHINE ROTOR

(71) Applicant: FORD GLOBAL TECHNOLOGIES, LLC, Dearborn, MI (US)

(72) Inventors: Franco Leonardi, Dearborn Heights, MI (US); Chuanbing Rong, Canton, MI (US); Chun Tang, Canton, MI (US); Wanfeng Li, Novi, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 328 days.

(21) Appl. No.: 18/304,924

(22) Filed: Apr. 21, 2023

(65) Prior Publication Data

US 2023/0253843 A1    Aug. 10, 2023

Related U.S. Application Data

(63) Continuation of application No. 16/567,720, filed on Sep. 11, 2019, now Pat. No. 11,637,467.

(51) Int. Cl.
  *H02K 1/27* (2022.01)
  *H02K 1/276* (2022.01)
  *H02K 1/28* (2006.01)

(52) U.S. Cl.
  CPC .............. *H02K 1/28* (2013.01); *H02K 1/276* (2013.01)

(58) Field of Classification Search
  CPC ............ H02K 1/28; H02K 1/276; H02K 1/02; H02K 1/2766; H02K 1/2706
  See application file for complete search history.

(56) References Cited

U.S. PATENT DOCUMENTS

| | | |
|---|---|---|
| 7,504,754 B2 | 3/2009 | Jahns et al. |
| 2015/0180294 A1 | 6/2015 | Vollrath |
| 2017/0126087 A1 | 5/2017 | Soderberg |
| 2017/0187258 A1 | 6/2017 | Fujikawa |
| 2018/0287439 A1* | 10/2018 | Degner ................ H02K 1/2766 |
| 2018/0315528 A1 | 11/2018 | Nanbara |
| 2019/0386532 A1 | 12/2019 | Vanderlip |
| 2020/0244120 A1 | 7/2020 | Gutjahr |

FOREIGN PATENT DOCUMENTS

| | | |
|---|---|---|
| WO | 2013/103118 A1 | 7/2013 |
| WO | 2018/101183 A1 | 6/2018 |
| WO | 2019110173 A1 | 6/2019 |

\* cited by examiner

*Primary Examiner* — Thomas Truong
(74) *Attorney, Agent, or Firm* — David B. Kelley; Brooks Kushman P.C.

(57) ABSTRACT

A rotor for an electric machine includes a core comprised of stacked laminations that define pockets between a hub portion and a pole portion. Each of the pockets are configured to receive magnetic material and define center cavities between regions of magnetic material to eliminate a flux leakage path between the magnetic materials. A cured mixture including an epoxy and a magnetic powder is disposed within the center cavities. The magnetic material may include sintered magnets and a cured mixture.

10 Claims, 6 Drawing Sheets

ADHESIVE MIXTURE INCLUDING HARD MAGNETIC MATERIAL FOR E-MACHINE ROTOR

CROSS-REFERENCE TO RELATED APPLICATION

This application is a continuation of U.S. application Ser. No. 16/567,720, filed Sep. 11, 2019, the disclosure of which is hereby incorporated in its entirety by reference herein.

TECHNICAL FIELD

This application generally relates to rotor design for electric machines.

BACKGROUND

Electrified vehicles include electric machines for providing some or all of the propulsive force for moving the vehicle. Electric machines are powered by an electrical source such as a battery. As a battery can only store a limited amount of energy, the electric machine may be designed to use that energy in a most efficient manner. Selecting an electric machine for vehicle applications may consider size, efficiency, and torque capability. Features that reduce the size, increase the torque capability, and improve efficiency of the electric machines can result in improved performance of the vehicle.

SUMMARY

A rotor for an electric machine includes a core comprised of stacked laminations that define a generally V-shaped pocket between a hub portion and a pole portion. The rotor further includes a cured mixture, filling the pocket and including an adhesive and a magnetic powder, having a volume ratio that increases as a distance normal from a centerline that bisects the pocket increases such that for a unit volume of the cured mixture, a volume of the magnetic powder increases relative to a volume of the adhesive as the distance increases, wherein a value of the volume ratio, for values of the distance less than a predetermined distance, is less than a predetermined ratio such that a yield strength of the cured mixture at the values of the distance less than the predetermined distance is at least equal to a yield strength of the laminations.

The predetermined distance may be defined by an outer edge of pocket. The magnetic powder may be an anisotropic magnetic powder and grains of the anisotropic magnetic powder may be aligned. The laminations may further define at least one retention feature proximate the centerline to provide additional surface area within a center bridge region for the cured mixture to adhere to. The adhesive may be one of an epoxy, a resin, and a thermoset. In some configurations, the volume ratio may exceed 60% for at least some of the cured mixture at a distance greater than the predetermined distance.

A rotor for an electric machine includes a plurality of sintered magnets and a core comprised of stacked laminations that define a pocket between a hub portion and a pole portion, the pocket configured to receive pairs of the sintered magnets and to define a center cavity between pairs of the sintered magnets. The rotor further includes a cured mixture, filling the center cavity and including an epoxy and a magnetic powder, having a volume ratio, defined by a volume of the magnetic powder to a volume of the epoxy, that is a predetermined ratio such that a yield strength of the cured mixture is at least equal to a yield strength of the laminations.

The volume ratio may increase as a distance to the sintered magnets decreases. The laminations may further define at least one retention feature within the center cavity to provide additional surface area within the center cavity for the cured mixture to adhere to. The at least one retention feature may define at least one surface on the hub portion such that a portion of the retention feature is between at least some of the cured mixture and the pole portion. The magnetic powder may be an isotropic powder. The magnetic powder may be an anisotropic powder and grains of the anisotropic powder may be aligned.

A rotor for an electric machine includes a core comprised of stacked laminations that define a pocket between a hub portion and a pole portion. The rotor further includes a first cured mixture filling a center region, defined as a predetermined distance normal from a centerline that bisects the pocket, of the pocket and including an adhesive and magnetic particles, having a first volume ratio defined by a volume of the magnetic particles to a volume of the adhesive. The rotor further includes a second cured mixture, filling a remaining volume of the pocket and including the adhesive and magnetic particles, having a second volume ratio.

The first volume ratio may be less than the second volume ratio such that the first cured mixture has a greater yield strength than the second cured mixture. The second volume ratio may be at least 60%. The magnetic particles may be an isotropic powder. The magnetic particles may be an anisotropic powder and grains of the anisotropic powder may be aligned. The first volume ratio may be a predetermined ratio that causes the first cured mixture to achieve a yield strength that is greater than a maximum radial stress caused by rotation of the rotor and an elastic deformation of the first cured mixture at the maximum radial stress is less than a predetermined radial deformation. The adhesive may be one of an epoxy, a resin, and a thermoset. The first volume ratio may be a predetermined ratio that causes the first cured mixture to achieve a yield strength that is at least equal to a yield strength of the laminations.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
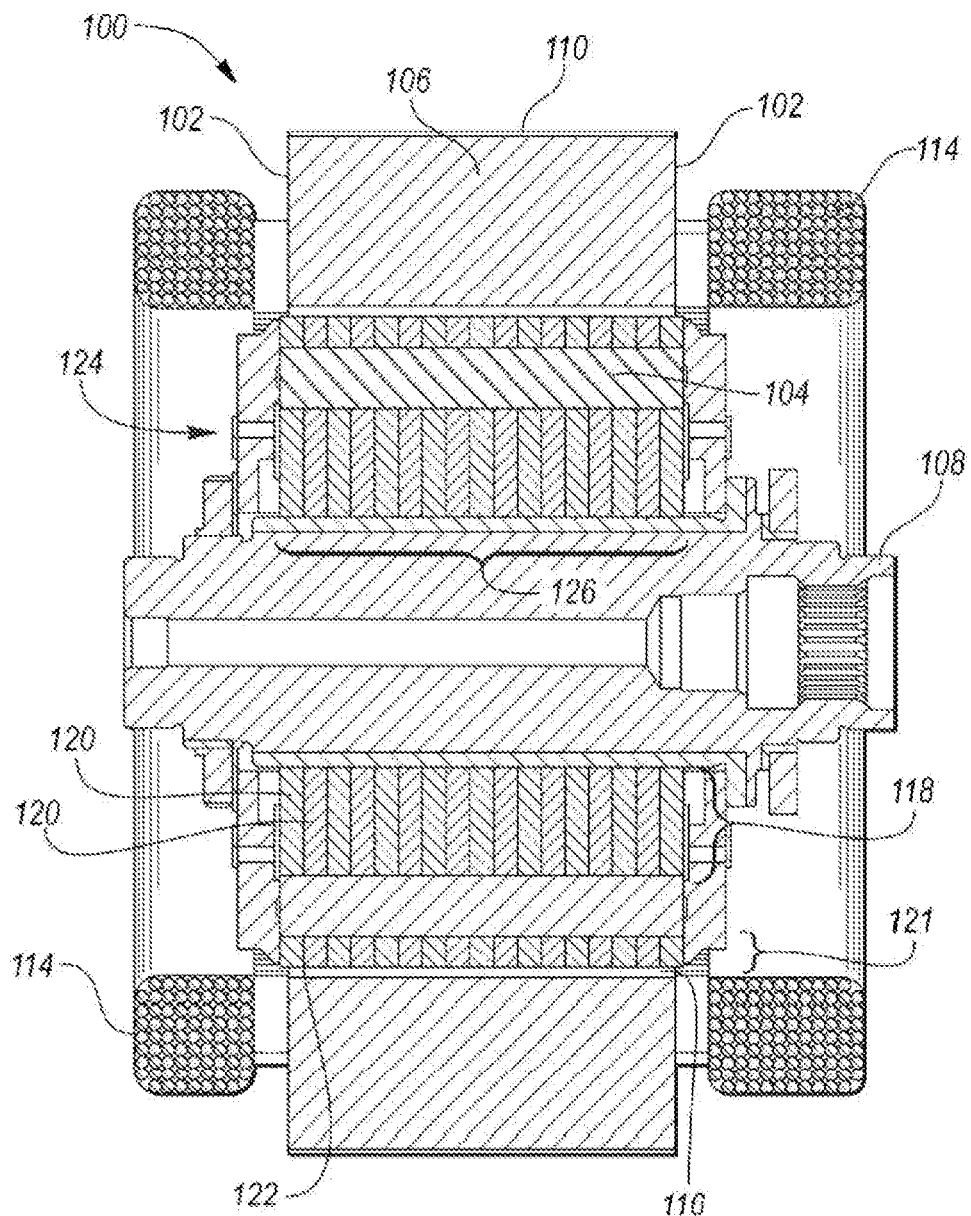
FIG. 1 depicts a possible configuration of an electric machine.

Referring to FIG. 1, an electric or hybrid electric vehicle may include an electric machine 100 for propelling the vehicle. The electric machine 100 may act as a motor and/or a generator depending upon operating conditions. The electric machine 100 may be a permanent magnet AC machine. While described as an electric machine for a vehicle, the electric machine 100 may be used in a wide range of applications.

The electric machine 100 may include a stator 110 having a plurality of laminations (not shown). Each of the laminations includes a front side and a back side. When stacked, the front and back sides are disposed against adjacent back and front sides to form a stator core 110. Each of the laminations may be toroidally-shaped and define a hollow center. Each lamination also includes an outer diameter (or outer wall) and an inner diameter (or inner wall). The outer diameters cooperate to define an outer surface of the stator core 110, and the inner diameters cooperate to define a cavity.

Each lamination may include a plurality of teeth extending radially inward toward the inner diameter. Adjacent teeth cooperate to define slots. The teeth and the slots of the laminations are aligned with each other to define stator slots extending through the stator core 110 between opposing end faces 102. The end faces 102 define the opposing ends of the core 110 and may be formed by the first and last laminations of the stator core 110. A plurality of windings (also known as coils, wires, or conductors) 106 are wrapped around the stator core 110 and are disposed within the stator slots. The windings 106 may be disposed in an insulating material (not shown). Portions of the windings 106 generally extend in an axial direction along the stator slots. At the end faces 102 of the stator core, the windings may bend to extend circumferentially around the end faces 102 of the stator core 110 forming end windings 114. The windings 106 may be distributed-type windings or may be concentrate-type windings.

A rotor 124 is disposed within the cavity and supported for rotation relative to the stator 110, which is typically a stationary component. The rotor 124 includes a rotor core 126 that may be formed of a plurality of stacked laminations 120. The laminations 120 are typically steel plates but may be formed of any material having a high magnetic permeability. Each of the laminations 120 may define one or more magnet pockets in a pocket region 104 that divides each lamination 120 into a central hub portion 118 and a pole portion 121 circumferentially arranged around the hub portion 118 near the periphery 122 of the rotor core 126. A plurality of magnets may be embedded in the pocket region 104 of the rotor core 126 with each magnet being disposed in a pocket that is formed in the pocket region 104 and extending axially through the rotor core 126. The arrangement and positions of the magnets define a plurality of poles of the rotor 124.

The rotor 124 may be supported on a shaft 108 and positioned inside the stator 110 so that an air gap 116 is formed between the rotor 124 and the stator 110. When current is supplied to the stator 110, a rotating magnetic field is created in the stator 110 generating a torque and causing the rotor 124 to spin within the stator 110. The shaft 108 is configured to output the torque to another component such as a gearbox.

Figure 2B:
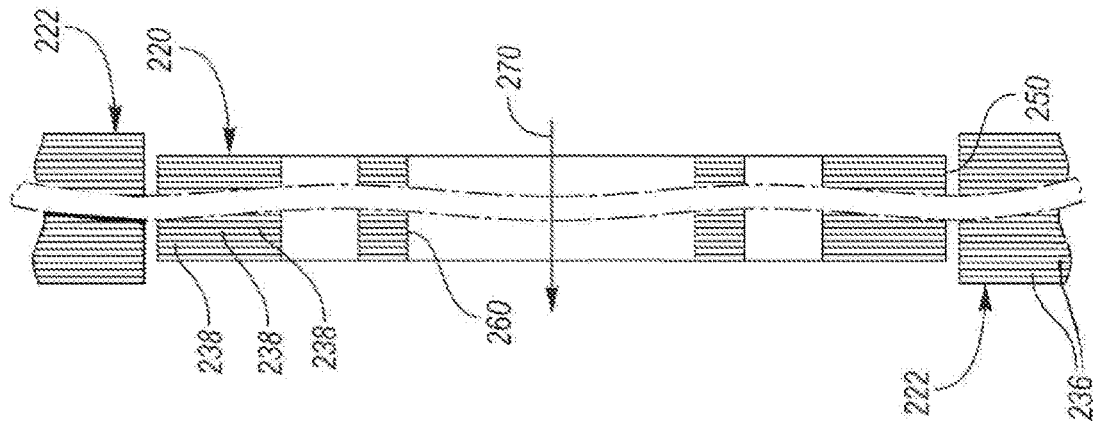
FIG. 2B is an example of a side view of a rotor constructed of a stack of rotor laminations.
Figure 2A:
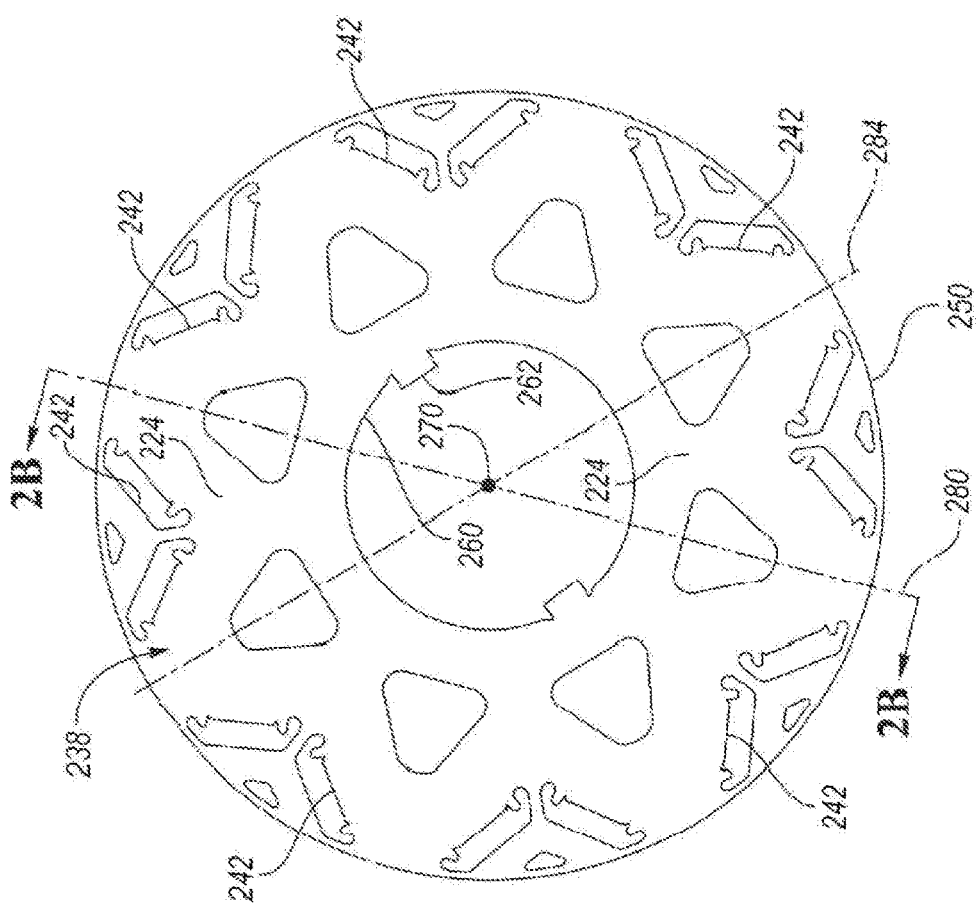
FIG. 2A is an example of a top view of a rotor lamination.

FIG. 2A depicts an example rotor lamination 238 and FIG. 2B depicts a side view of stator 222 and rotor 220 configurations having multiple rotor laminations 238 and multiple stator laminations 236 arranged in an axially stacked relationship. The rotor laminations 238 may define a circular central opening 260 for accommodating a drive shaft with a keyway that may receive a drive key 262. The rotor laminations 238 may define a plurality of magnet openings 242 that are symmetrically disposed with respect to adjacent pairs of magnet openings 242.

A plurality of rotor sectors 224 corresponding to magnetic poles of the rotor may be defined by a plurality of inter-polar axes (e.g., 280, 284) emanating from a central axis 270 of rotation to an outer surface 250 of the rotor lamination 238. Each of the sectors 224 may include a pair of magnet openings 242. The inter-polar axes (e.g., 280, 284) may be positioned to be midway between adjacent pairs of magnet openings 242. Note that FIG. 2A only shows two of the possible inter-polar axes 280, 284 and does not show all possible inter-polar axes. FIG. 2B depicts a series of axially stacked rotor laminations 238 that are stacked along the central axis 270 about which the rotor 220 is configured to rotate.

Figure 3:
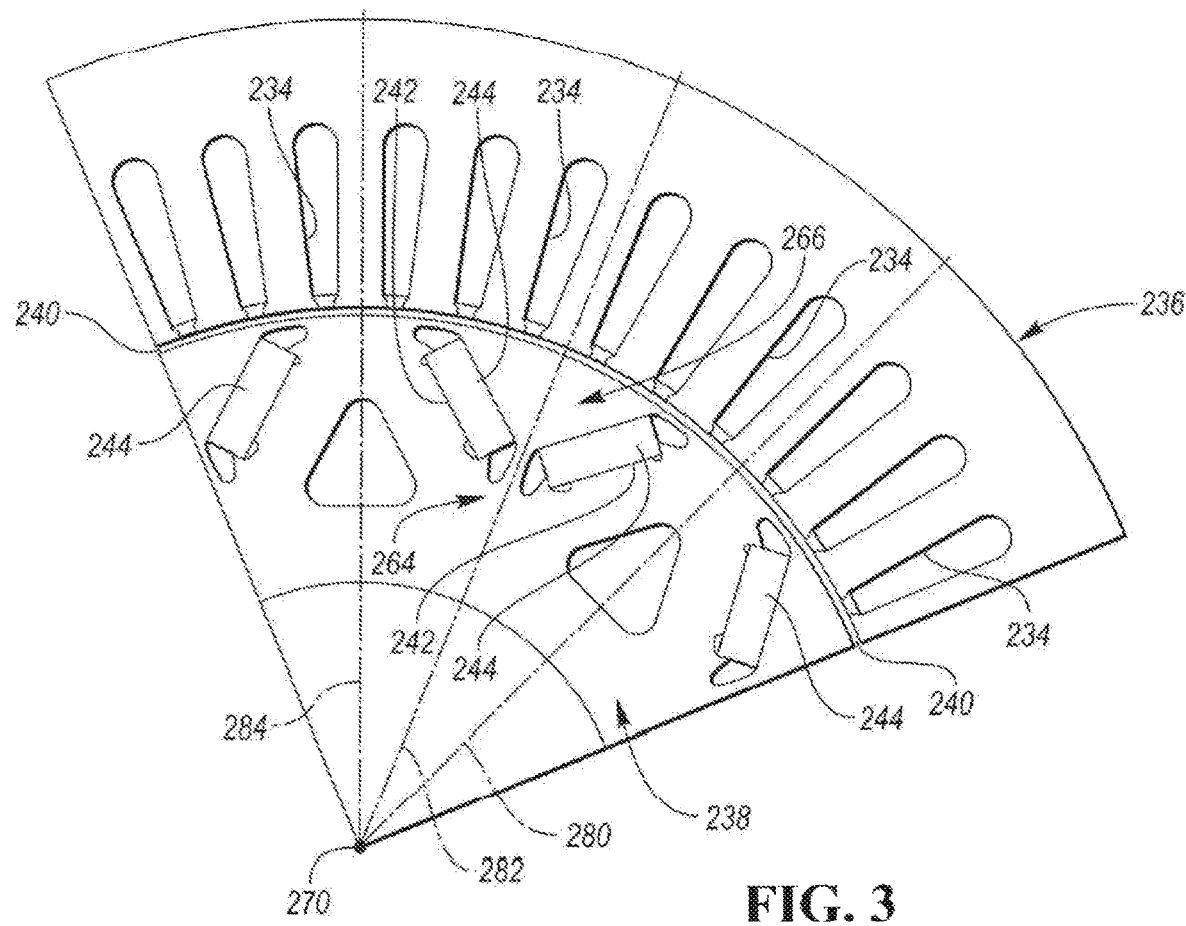
FIG. 3 is an example of partial rotor and stator laminations.

FIG. 3 depicts a partial radial cross-sectional view of a possible construction of the rotor 220 and the stator 222. A partial stator lamination 236 and a partial rotor lamination 238 are depicted in FIG. 3. The rotor laminations 238 and the stator laminations 236 may be comprised of a ferrous alloy. A small air gap 240 is located between the inner periphery of the stator laminations 236 and the outer periphery 250 of the rotor laminations 238. The stator laminations 236 may define radially extending openings 234 for receiving stator conductors or phase wiring.

The rotor laminations 238 may define symmetrically positioned magnet openings 242 near the outer periphery 250 of each rotor lamination 238. Each magnet opening 242 may be configured to receive a magnet 244. The magnet openings 242 may separate each of the sectors or poles of the rotor laminations 238 into a central hub portion 264 and a pole portion 266. Any number of laminations in a given design may be used, depending on design choice. The rotor laminations 238 and the stator laminations 236 may be arranged in a stack along the axis 270 of rotation. The axially stacked rotor laminations 238 and the magnets 244 may define a plurality of magnetic poles distributed about the axis 270.

The stator 222 may have conductors disposed in the radially extending openings 234 to form windings. The stator 222 may be comprised of an iron core made of a stack of stator laminations 236 and a winding arrangement for conductors that carry an excitation current. Current flowing through the stator winding generates a stator electromagnetic flux. The stator flux may be controlled by adjusting the magnitude and frequency of the current flowing through the stator windings. Because the stator windings are contained in openings 234 rather than a uniform sinusoidal distribution along the inner circumference of the stator, there may be harmonic fluxes in the stator flux.

The rotor 220 may be comprised of an iron core made of a stack of rotor laminations 238 and sets of permanent magnets 244 inserted within pockets or cavities 242 that are defined by the iron core. The permanent magnets 244 in the rotor 220 may generate a rotor electromagnetic flux. The rotor flux may include harmonic fluxes due to shapes and sizes of the discrete permanent magnets. The stator flux and the rotor flux may be distributed in the air-gap 240. Interaction between the stator flux and the rotor flux causes the rotor 220 to rotate about the axis 270.

Poles of the rotor 220 may be geometrically defined to correspond to the sectors 224 defined by the rotor laminations 238. Each of the poles may be represented by a sector 224. A pole location may be generally defined by a center-pole axis 282 that extends radially from the axis 270 toward the outer surface 250 of the rotor 220 along a midpoint between adjacent magnet openings 242 that comprise a pair. The inter-polar axes (e.g., 280, 284) may extend radially from the axis 270 toward the outer surface 250 of the rotor 238 between adjacent poles. An angular distance between two adjacent poles may define a pole pitch parameter. The arc length on the circumferential rotor surface 250 between two adjacent poles of the rotor may be referred to as the pole pitch. The pole pitch may be measured circumferentially around the outer rotor surface 250 between adjacent center-pole axes 282. Each pole may have an associated surface area on the outer circumferential surface 250 of the rotor 220. Each pole may be represented by the arc length on the surface between adjacent inter-polar axes 280, 284.

Figure 4:
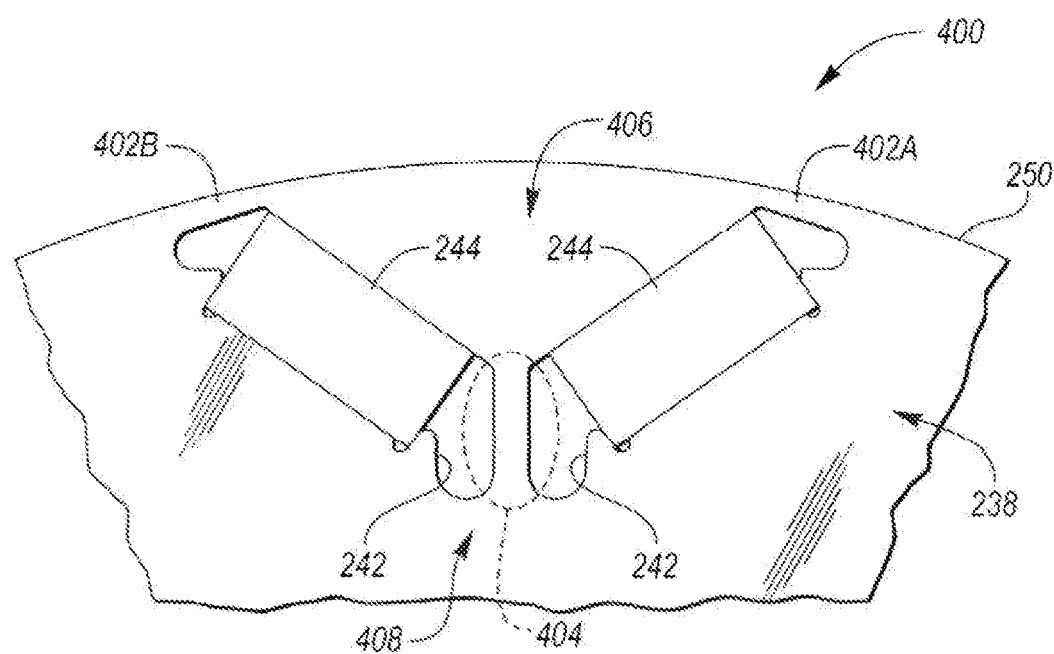
FIG. 4 depicts a portion of a rotor including a bridge region between magnets.

FIG. 4 depicts a partial view of a rotor center bridge configuration 400 showing the rotor lamination 238 with a magnet 244 inserted in the magnet openings 242. Poles of the rotor may be defined by pairs of magnets 244 that may be oriented to form a V-shape. FIG. 4 further highlights several regions of the rotor lamination 238. A pole portion 406 may include that portion of the rotor lamination 238 between the outer surface 250 and the magnet opening 242. A hub portion 408 may include that portion of the rotor lamination 238 between the magnet openings 242 and the central axis 270. The pole portion 406 and the hub portion 408 may be defined for each pole of the rotor. An outer bridge region 402 may be defined between the outer surface 250 and the portion of the magnet openings 242 that are closest to the outer surface 250. An inner or center bridge region 404 may be defined as a region between the adjacent magnet openings 242 in the area at which the distance between the magnet openings is a minimum. The center bridge region 404 may include material that separates the adjacent magnet openings 242. The outer bridge regions 402 and the center bridge region 404 help to maintain structural integrity of the rotor when spinning. For example, the center bridge region 404 secures the central hub portion 408 to the pole portion 406. The outer bridge regions 402 and the center bridge region 404 also produce a magnetic short-circuit that can result in reduced torque production by the electric machine.

In the configuration of FIG. 4, the material that composes the center bridge region 404 may have certain properties defined by the type of material used. For example, the rotor lamination 238 may be formed from electrical sheet steel. For example, electrical steel may be graded according to American Iron and Steel Institute (AISI) and Society of Automotive Engineers (SAE) standards. Typical grades for electric machines includes steel designations M-15 through M-47. Electrical steel may be selected based on desired magnetic properties and may be characterized by certain parameters. For example, the parameters may include yield strength and tensile strength. The yield strength may be defined as the amount of stress applied at which the material begins to deform plastically. That is, the amount of force or stress applied that causes the material to deform such that it does not return to its original shape after the force or stress is removed. The tensile strength may be defined as the amount of stress applied to cause the material to break. For example, the electrical steel used in motors may have a yield strength of 300 N/mm$^2$ and a tensile strength of 400 N/mm$^2$. The parameters are applicable to the center bridge region 404 as the center bridge region 404 is subject to forces or stress as the rotor rotates. The center bridge region 404 may be subject to a maximum radial stress caused by rotation of the rotor. A robust design may ensure that the center bridge region 404 is capable of handling the maximum amount of stress caused by operation of the electric machine. In addition, the center bridge region 404 may be subject to elastic deformation due to the radial stress caused by rotation of the rotor. The exact yield strength and tensile strength of the material depends on the steel formulation and any work hardening or other treatments that may be applied.

Figure 5:
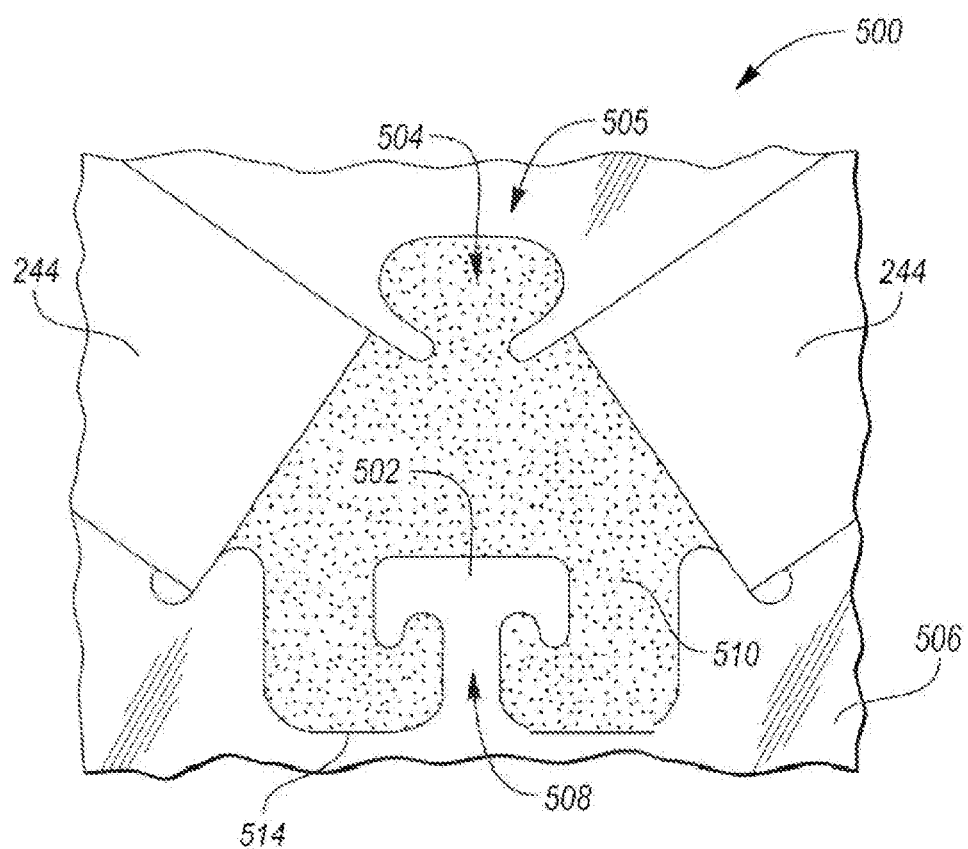
FIG. 5 depicts a portion of a rotor including a modified bridge region between magnets.

Disclosed herein are rotor configurations in which the center bridge region 404 is redefined to eliminate the flux leakage limitations. FIG. 5 depicts a first rotor configuration 500. The first center bridge rotor configuration 500 may be comprised of rotor laminations 506 constructed of a ferrous alloy and axially stacked. The rotor laminations 506 may define a cavity or pocket 514 configured to receive pairs of magnets 244. The rotor laminations 506 may be constructed such that the pocket 514 is formed that includes regions for insertion of a pair of magnets 244. The pocket 514 may be further defined without lamination material in the center bridge region between magnets 244 to improve the flux leakage. Areas of the pocket 514 that do not receive the magnets 244 may be filled with a cured mixture 510 that includes an adhesive and magnetic particles. The cured mixture 510 may be referred to as a doped adhesive mixture and the volume ratio of magnetic particles to adhesive is not limited. The adhesive of the cured mixture 510 may include a resin, an epoxy, or a thermoset. The adhesive and magnetic particles may be mixed and flowed into empty regions of the pocket 514 and cured to a hardened state (e.g., the cured mixture 510). The presence of the magnetic particles in the cured mixture 510 allows the center bridge region to become a flux generating portion of the rotor.

The cavity or pocket 514 may further define one or more retention features. The retention features may include a projection 502 and/or a concavity 504. The projection 502 and the concavity 504 may be formed in the center bridge region. The projection 502 and the concavity 504 may be separated by a gap. In the example, the projection 502 extends from a hub portion 508 of the rotor laminations 506.

The concavity 504 may be defined as part of a pole portion 505 of the rotor laminations 506.

The projection 502 and the concavity 504 may be defined to provide additional bonding surfaces for the cured mixture 510 that fills the pocket 514 to maintain the structural integrity. The projection 502 and the concavity 504 may help to strengthen the center bridge region. The projection 502 may be generally shaped to form a narrow portion extending from the hub portion 508 or the pole portion 505 and a wider portion at a distal end proximate the gap. In the example, the projection 502 is T-shaped. The concavity 602 may be shaped as a three-sided trapezoid or as an incomplete oval. In other configurations, the retention features may be two projection features, two concavity features, or any combination thereof. The retention feature may define at least one surface on the hub portion 508 such that a portion of the retention feature is between at least some of the cured mixture 510 and the pole portion 505. The retention feature may also define at least one surface on the pole portion 505 such that a portion of the retention feature is between at least some of the cured mixture 510 and the hub portion 508

The magnets 244 may be sintered magnets. Sintered magnets may be formed of magnetic powder that is compressed to form a magnet. The magnets 244 may be inserted into the pocket 514. The magnets 244 may be pre-formed and inserted into the pocket 514.

The cured mixture 510 may include an adhesive (e.g., epoxy, a resin, or a thermoset) that is mixed with magnetic particles. The magnetic particles may be a magnetically hard powder. Hard magnetic materials may resist demagnetization once the material is magnetized. The amount of magnetic particles in the cured mixture 510 may change the magnetic properties of the mixture. Addition of the magnetically hard powder may also enhance the mechanical strength of the adhesive. However, reducing the adhesive content below a threshold may result in a lower yield strength.

The magnetic particles/powders may include melt-spun flakes, melt-spun powders, hydrogen disproportionation desorption recombination (HDDR) powders, and/or processed sintered magnets. Various permanent magnet materials may be used (e.g., Nd—Fe—B, Sm—Fe—N). The magnetic powders may be isotropic or anisotropic powders. For anisotropic powders, grains of the anisotropic magnetic powder may be aligned under a magnetic field before or during the curing process. For example, the magnetic field may be applied for a predetermined time to align grains of the magnetic particles before the curing process. In other cases, the magnetic field may be applied during the curing process. A magnetic field may be applied during curing or insertion to magnetize the particles in both isotropic and anisotropic powders. The magnetic strength of the cured mixture 510 may increase linearly with the volume of magnetic particles in the mixture. The adhesive and magnetic particles may be mixed and disposed within the pockets by transfer molding or injection molding. Other methods of filling are also applicable.

The yield strength and tensile strength may be affected by a volume ratio of the magnetic particles to the adhesive. A volume ratio of zero would include no magnet particles (e.g., only adhesive present) and would not exhibit enhanced magnetic properties. A volume ratio of 100% would include no adhesive (e.g., only magnetic particles present) and may not have acceptable mechanical properties. The yield strength of the cured mixture 510 may vary with the volume ratio. The volume ratio of the magnet particles to the adhesive may be selected to be a threshold ratio that corresponds to a yield strength of the cured mixture 510 being greater than a predetermined yield strength. In some examples, the predetermined yield strength may be a value that is greater than a maximum radial stress caused by rotation of the rotor. The predetermined yield strength may be selected to exceed the maximum radial stress by a predetermined factor or margin. In other examples, the predetermined yield strength may be selected as a yield strength that is at least equal to the yield strength of an electrical steel center bridge. The predetermined yield strength may be selected so that the center bridge region will perform as well as a rotor having a traditional center bridge. The cured mixture 510 may provide a sufficient amount of structural integrity to prevent deformation of the rotor during operation while also improving magnetic characteristics. The volume ratio may be further selected such that an amount of elastic deformation at the maximum radial stress is less than a predetermined radial deformation.

It may be noted that there may be an upper limit for the volume ratio as increasing the volume ratio above a threshold may result in a decreasing yield strength. For example, with 100% magnetic particles the yield strength may be a small value since there is no adhesive to adhere the magnetic particles to the laminations. Additionally, there may be a range of volume ratios that satisfy the yield strength condition. The volume ratio may be selected by further considering the magnetic and/or other performance properties. For example, removing the inner bridge may account for an increase of approximately 5% in the peak torque rating of the electric machine. An anisotropic powder may increase the peak torque by an additional 3% for each 20% increase in volume ratio. An isotropic powder may increase the peak torque by an additional 2% for each 20% increase in volume ratio. The volume ratio may be selected to balance the peak torque and yield strength parameters.

The configurations described in the following may include a cured mixture as described previously herein. In addition, the configurations that follow may also include any combination of retention features in a central bridge region as described previously herein. Similarly labeled features in the following configuration may be as described above.

Figure 6:
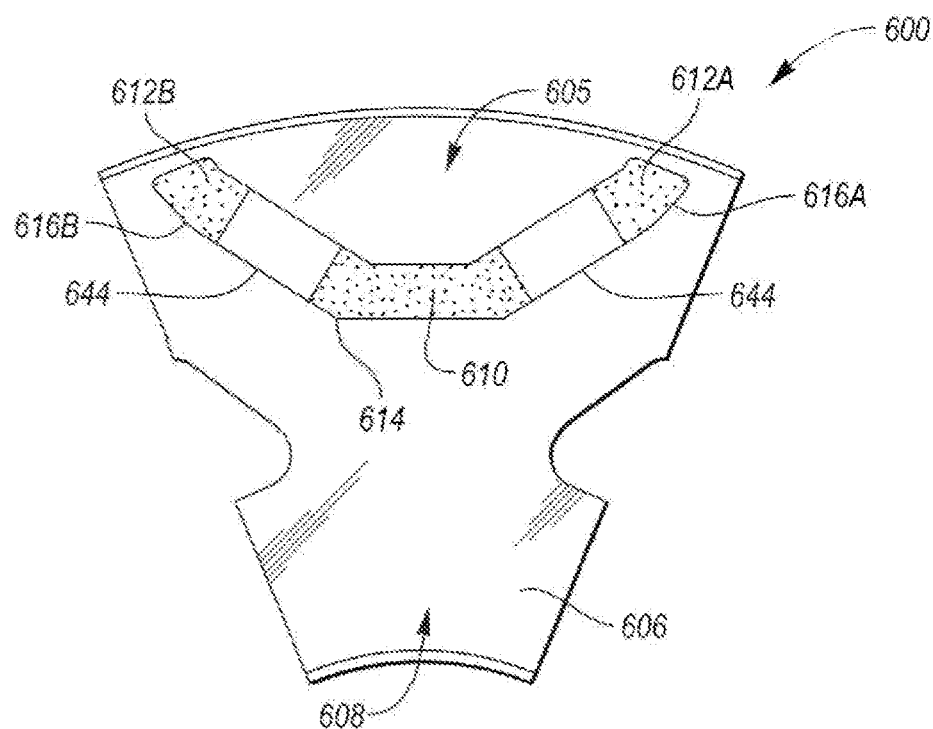
FIG. 6 depicts a portion of a rotor including a bridge region with a cured mixture of adhesive and magnetic particles.

FIG. 6 depicts a possible reduced-size magnet rotor configuration 600. The rotor configuration 600 may be comprised of rotor laminations 606 constructed of a ferrous alloy and axially stacked. The rotor laminations 606 may define a cavity or pocket configured to receive pairs of magnets 644. The rotor lamination 606 may define a hub portion 608 and a pole portion 605. The rotor laminations 606 may be constructed such that the pocket is formed that includes regions for insertion of a pair of sintered magnets 644. A center cavity or center pocket 614 may be defined between the pairs of magnets 644 and may be filled with a cured mixture 610. For example, the cured mixture 610 may include a resin, an epoxy, or a thermoset with magnetic particles distributed throughout. The adhesive and magnetic particles may be mixed and flowed into empty regions of the pocket 614 and cured to a hardened state. The cavity or pocket may further define one or more retention features (not shown) as discussed in relation to FIG. 5 to provide additional surface area within the center cavity 614 for the cured mixture 610 to adhere to.

In this configuration, the size of the sintered magnets 644 may be reduced. In this example, the pocket 614 defines additional end cavities 616 that are not filled by the sintered magnets 644. The end cavities 616 may be filled with an adhesive or a second cured mixture 612. The second cured mixture 612 used in the end cavities 616 may have a different volume ratio than the cured mixture 610 used in the center pocket 614. In some configurations, the volume ratio of the end cavity cured mixture 612 may be greater than the volume ratio of the center pocket cured mixture 610. In these configurations, the adhesive content may be optimized in the center pocket 614 to improve the yield strength in the center bridge region. The magnetic powder content may be optimized in the end cavities 616 to improve the magnetic performance.

In some configurations, the center cavity cured mixture 610 may have a consistent volume ratio throughout the center cavity 614. In some configurations, the volume ratio may be varied across the center cavity 614. For example, the volume ratio of the magnetic powder to the adhesive may increase as a distance to the sintered magnets 644 decreases. In this case, the magnetic properties are increased near the sintered magnets 644 while the mechanical properties (e.g., yield strength) are increased at the center. By using the adhesive mixed with magnetic powder, the size of the sintered magnets 644 may be reduced and effectively replaced by the cured mixture 610 and the second cured mixture 612 with no reduction in performance.

Figure 7:
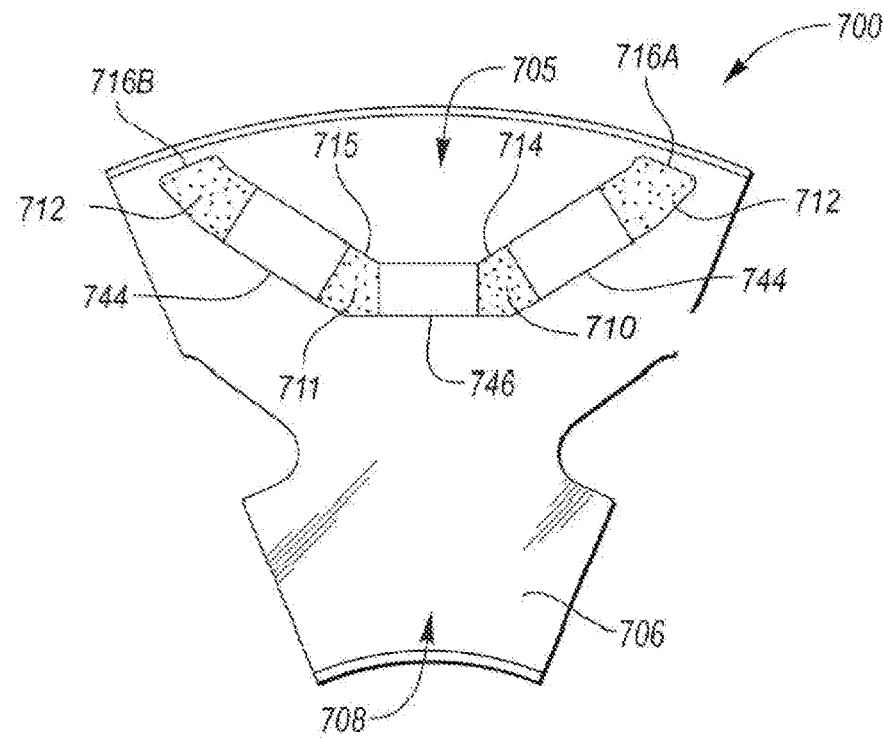
FIG. 7 depicts a portion of a rotor including a third magnet in the bridge region and a cured mixture of adhesive and magnetic particles.

FIG. 7 depicts a possible reduced-size magnet rotor configuration 700. The rotor configuration 700 may be comprised of rotor laminations 706 constructed of a ferrous alloy and axially stacked. The rotor laminations 706 may define a cavity or pocket configured to receive a plurality of side magnets 744 and a central magnet 746. The rotor lamination 706 may define a hub portion 708 and a pole portion 705. The rotor laminations 706 may be constructed such that the pocket is formed that includes regions for insertion of the side magnets 744 and the central magnet 746. A first center cavity 714 and a second center cavity 715 may be defined between the central magnet 746 and the side magnets 744. The first center cavity 714 may be filled with a first cured mixture 710 and the second center cavity 715 may be filled with a second cured mixture 711. The adhesive and magnetic particles may be mixed and flowed into empty regions of the first center cavity 714 and cured to a hardened state. The adhesive and magnetic particles may be mixed and flowed into empty regions of the second center cavity 715 and cured to a hardened state. The volume ratio of magnetic particle to adhesive may be the same for the first cured mixture 710 and the second cured mixture 711. The center cavities 715, 714 may further define one or more retention features (not shown) as discussed in relation to FIG. 5 to provide additional surface area within the center cavities 714, 715 for the cured mixtures 710, 711 to adhere to.

In this configuration, the size of the side magnets 744 may be reduced. In this example, there are additional end cavities 716 that are not filled by the magnets 744. The end cavities 716 may be filled with an adhesive or a third cured mixture 712. The third cured mixture 712 used in the end cavities 716 may have a different volume ratio than the first and second cured mixtures 710, 711 used in the center cavities 714, 715. In some configurations, the volume ratio of the end cavity cured mixture 712 may be greater than the volume ratio of the center pocket cured mixtures 710, 711. In these configurations, the adhesive content may be optimized in the center cavities 714, 715 to improve the yield strength in the center region. The magnetic powder content may be optimized in the end cavities 716 to improve the magnetic performance.

In some configurations, the center cavity cured mixtures 710, 711 may have a consistent volume ratio throughout the center cavities 714, 715. In some configurations, the volume ratio may be varied across the center cavities 714, 715. For example, the volume ratio of the magnetic powder to the adhesive may increase as a distance to the side magnets 744 decreases. In this case, the magnetic properties are increased near the side magnets 744 while the mechanical properties (e.g., yield strength) are increased at the center. By using the adhesive mixed with magnetic powder and the center magnet 746, the size of the side magnets 744 may be reduced.

Figure 8:
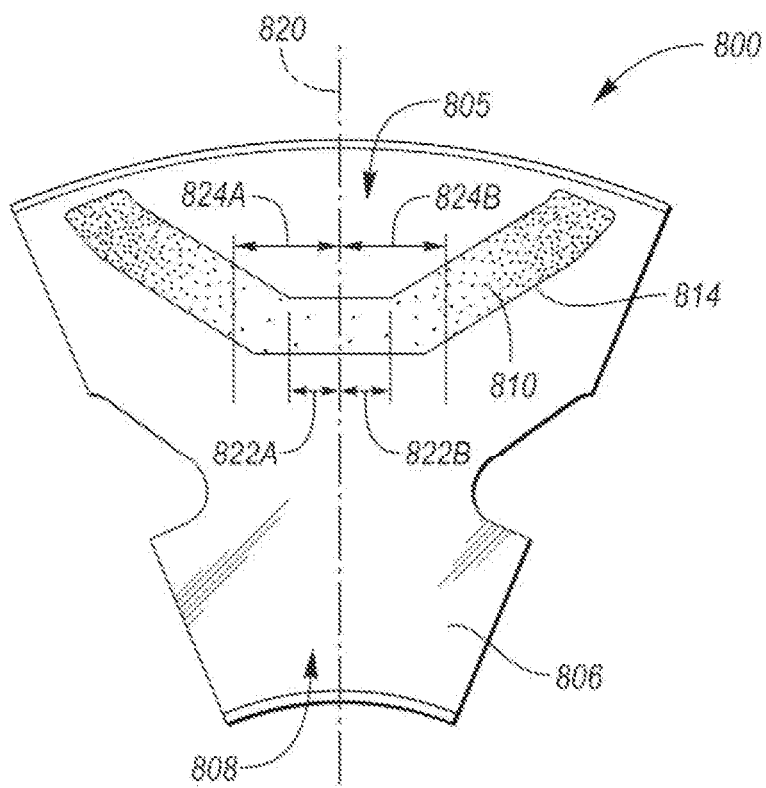
FIG. 8 depicts a portion of a rotor in which the sintered magnets are replaced by a cured mixture of adhesive and magnetic particles.

FIG. 8 depicts a possible rotor configuration 800 in which there are no sintered magnets. The rotor configuration 800 may be comprised of rotor laminations 806 constructed of a ferrous alloy and axially stacked. The rotor laminations 806 may define a cavity or pocket 814. The pocket 814 may be generally V-shaped or U-shaped. The rotor lamination 806 may define a hub portion 808 and a pole portion 805. The pocket 814 may be filled with a cured mixture 810. The adhesive and magnetic particles may be mixed and flowed into the pocket 814 and cured to a hardened state. The pocket 814 may define one or more retention features (not shown) as discussed in relation to FIG. 5 to provide additional surface area within a central region of the pocket 814 for the cured mixture 810 to adhere to. The pocket 814 may be symmetric about a centerline 820. The centerline 820 may bisect the pocket 814.

In the rotor configuration 800, the volume ratio of the cured mixture 810 may vary by location within the pocket 814. For example, the volume ratio may change linearly from the central region toward the ends of the pocket 814. The volume ratio may increase towards the ends of the pocket 814. The volume ratio may increase as a distance 822 normal from the centerline 820 increases such that for a unit volume of the cured mixture 810, a volume of the magnetic powder increases relative to a volume of the adhesive as the distance 822 increases. The volume ratio may be changed in discrete length intervals to facilitate insertion of the adhesive and magnetic particle mixture into the pocket 814. In configurations having a variable volume ratio within the pocket 814, the machine properties may be adjusted by changing the volume ratio. In other configurations, the volume ratio may be constant throughout the pocket 814. In one example, a volume ratio of 60% may allow an adhesive mixed with an anisotropic powder to achieve an equal torque to a traditional sintered magnet arrangement.

The volume ratio may be selected such that a value of the volume ratio, for values of the distance 822 less than a predetermined distance 824, is less than a predetermined ratio such that a yield strength of the cured mixture 810 at the values of the distance 822 less than the predetermined distance 824 is at least equal to the yield strength of the laminations 806. In other configurations, the volume ratio may be selected such that the yield strength of the cured mixture 810 is greater than a maximum radial stress caused by rotation of the rotor and an elastic deformation of the cured mixture 810 at the maximum radial stress is less than a predetermined radial deformation. The predetermined distance 824 may be defined and/or limited by an outer edge of the pocket 814. The outer edge may be an edge that is adjacent to the hub portion 808. The volume ratio may be selected to ensure that the cured mixture 810 does not deform more the predetermined radial deformation at the maximum radial stress expected to be present during operation of the electric machine.

Figure 9:
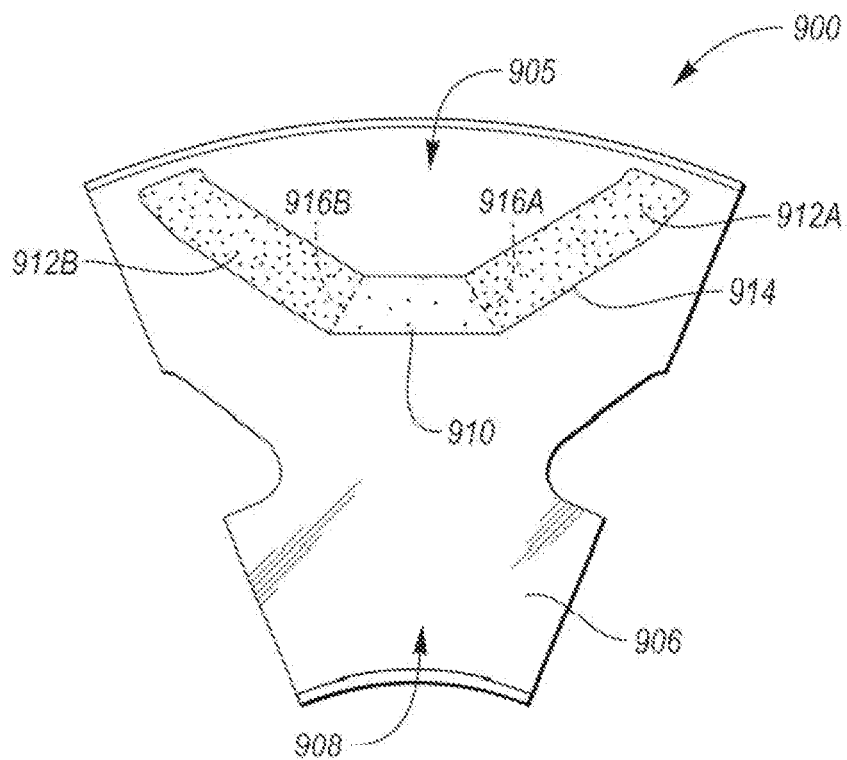
FIG. 9 depicts a portion of a rotor in which the sintered magnets are replaced by cured mixture segments that have different volume ratios of magnetic particles to adhesive.

FIG. 9 depicts another possible rotor configuration 900 in which there are no sintered magnets. The rotor configuration 900 may be comprised of rotor laminations 906 constructed of a ferrous alloy and axially stacked. The rotor laminations 906 may define a cavity or pocket 914. The pocket 914 may be generally V-shaped or U-shaped. The rotor lamination 906 may define a hub portion 908 and a pole portion 905. The pocket 914 may be filled with a plurality of cured mixtures to define different segments. A first segment 910 may be defined in a central region of the pocket 914. The first segment 910 may be comprised of a first cured mixture mixed at a first volume ratio. The adhesive and magnetic particles may be mixed and flowed into the first segment 910 and cured to a hardened state. The pocket 914 may define one or more retention features (not shown) as discussed in relation to FIG. 5 to provide additional surface area within the first segment 910 for the first cured mixture to adhere to.

The pocket 914 may further define side segments 912 on each side of the first segment 910. The side segments 912 may be comprised of a second cured mixture mixed at a second volume ratio. The adhesive and magnetic particles may be mixed and flowed into the side segments 912 and cured to a hardened state. The interface between the first segment 910 and the side segments 912 may define a boundary 916. For example, the boundary 916 may be formed by injecting the mixture of adhesive and magnetic particles at the first volume ratio into the first segment 910 and allowing the filler to harden or cure in the desired shape to form the boundary 916. A temporary mold may also be used to define the boundaries 916 of the first segment 910 during filling. The mixture of adhesive and magnetic particles at the second volume ratio may then be injected into the side segments 912. Note that the filling order could be reversed (e.g., first segment 910 filled last).

The first volume ratio for the mixture in the first segment 910 may be less than the volume ratio used in the side segments 912. It may be preferred to have a greater adhesive concentration in the first segment 910 to aid in the mechanical integrity of the structure near the center bridge region. The higher volume ratio in the side segments 912 may effectively replace sintered magnets in the rotor and may be selected based on the desired torque characteristics.

The rotor configurations described herein improve electric machine performance by reducing flux leakage in the central region between magnets. By adding a cured mixture that includes adhesive and magnetic particles in the central region, the magnetic properties are improved resulting in increased torque production. In addition, the cured mixture can replace traditional magnets. Since the cured mixture may conform to the cavity, different pocket/cavity designs may be pursued. The cured mixture allows for replacement of the sintered magnets. The cured mixture further allows the rotor to retain sufficient mechanical integrity while improving the performance of the electric machine.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A rotor for an electric machine comprising:
   a core comprised of stacked laminations that define a generally V-shaped pocket between a hub portion and a pole portion; and
   a cured mixture, filling the pocket and including an adhesive and a magnetic powder, having a volume ratio that increases as a distance normal from a centerline that bisects the pocket increases such that for a unit volume of the cured mixture, a volume of the magnetic powder increases relative to a volume of the adhesive as the distance increases.

2. The rotor of claim 1, wherein the magnetic powder is an anisotropic magnetic powder and wherein grains of the anisotropic magnetic powder are aligned.

3. The rotor of claim 1, wherein the laminations further define at least one retention feature proximate the centerline to provide additional surface area within a center bridge region for the cured mixture to adhere to.

4. The rotor of claim 1, wherein the adhesive is one of an epoxy, a resin, and a thermoset.

5. A rotor for an electric machine comprising:
   a plurality of sintered rectangular magnets each having shorter sides and longer sides;
   a core comprised of stacked laminations that define a pocket between a hub portion and a pole portion, the pocket configured to receive a pair of the sintered magnets such that some of the shorter sides and the pocket define a center cavity between the pair of sintered magnets; and
   a cured mixture, filling the center cavity and including an epoxy and a magnetic powder, having a volume ratio, defined by a volume of the magnetic powder to a volume of the epoxy, that is a predetermined ratio such that a yield strength of the cured mixture is greater than a maximum radial stress caused by rotation of the rotor and an elastic deformation of the cured mixture at the maximum radial stress is less than a predetermined radial deformation.

6. The rotor of claim 5, wherein the volume ratio increases as a distance to the sintered magnets decreases.

7. The rotor of claim 5, wherein the laminations further define at least one retention feature within the center cavity to provide additional surface area within the center cavity for the cured mixture to adhere to.

8. The rotor of claim 7 wherein the at least one retention feature defines at least one surface on the hub portion such that a portion of the retention feature is between at least some of the cured mixture and the pole portion.

9. The rotor of claim 5, wherein the magnetic powder is an isotropic powder.

10. The rotor of claim 5, wherein the magnetic powder is an anisotropic powder and wherein grains of the anisotropic powder are aligned.

* * * * *